(12) United States Patent
Camelli

(10) Patent No.: US 7,798,305 B2
(45) Date of Patent: Sep. 21, 2010

(54) CAROUSEL FOR THE WAREHOUSING OF GOODS

(75) Inventor: Marco Camelli, Faenza (IT)

(73) Assignee: JBC S.R.L., Faenza (IT)

(*) Notice: Subject to any disclaimer, the term of this patent is extended or adjusted under 35 U.S.C. 154(b) by 255 days.

(21) Appl. No.: 11/922,384

(22) PCT Filed: Jun. 9, 2006

(86) PCT No.: PCT/IT2006/000436

§ 371 (c)(1),
(2), (4) Date: Dec. 13, 2007

(87) PCT Pub. No.: WO2006/137095

PCT Pub. Date: Dec. 28, 2006

(65) Prior Publication Data

US 2009/0208318 A1    Aug. 20, 2009

(30) Foreign Application Priority Data

Jun. 23, 2005  (IT) .......................... RA2005A0024

(51) Int. Cl.
*B65G 37/00* (2006.01)

(52) U.S. Cl. ............... 198/347.1; 198/367; 198/457.05; 198/580; 198/442; 198/412

(58) Field of Classification Search ............. 198/347.1, 198/367, 457.05, 580, 786, 611, 452, 442, 198/416, 412
See application file for complete search history.

(56) References Cited

U.S. PATENT DOCUMENTS

| | | | | |
|---|---|---|---|---|
| 1,763,809 A | * | 6/1930 | Murphy | 198/354 |
| 1,872,006 A | * | 8/1932 | Regan | 198/457.05 |
| 2,003,097 A | * | 5/1935 | Vickery | 209/620 |
| 2,078,236 A | * | 4/1937 | Chapman | 198/457.05 |
| 2,580,054 A | * | 12/1951 | Vincent | 198/457.05 |
| 2,630,202 A | * | 3/1953 | Saxe | 198/580 |
| 3,303,918 A | | 2/1967 | Larson | |
| 3,662,905 A | | 5/1972 | Mizuno | |
| 4,496,110 A | * | 1/1985 | Raasch et al. | 242/473.4 |
| 4,572,447 A | * | 2/1986 | Raasch | 242/473.4 |
| 6,241,074 B1 | * | 6/2001 | Steeber | 198/456 |
| 7,032,742 B2 | * | 4/2006 | Hartness et al. | 198/594 |

(Continued)

FOREIGN PATENT DOCUMENTS

| | | |
|---|---|---|
| JP | 1321205 A | 12/1989 |
| WO | WO 99/35061 | 7/1999 |
| WO | WO 02/074663 A1 | 9/2002 |

OTHER PUBLICATIONS

Patent Abstract of Japan JP-01 122814, Aug. 16, 1989.

*Primary Examiner*—Mark A Deuble
(74) *Attorney, Agent, or Firm*—Abelman, Frayne & Schwab

(57) ABSTRACT

Rack (1) for the dynamic warehousing of goods boxed in containers (S), of the type including at least one bidirectional conveyor device (2) for the containers (S); and at least some means of inversion (4 and 4a) of the movement and connection of conveyor devices (2), the means (4) of inversion of the movement (4) being fitted with variable-geometry guiding means (6), movable between an open operating position (A) and a closed position (B); the means (4) of inversion of the movement including at least one rotating disc (12) capable of transporting the containers (5) along a substantially semicircular path corresponding to the closed operating position (B).

15 Claims, 9 Drawing Sheets

U.S. PATENT DOCUMENTS 7,222,723 B2 * 5/2007 Horton et al. ............... 198/594
2003/0152446 A1 8/2003 Joutsjoki et al.
2005/0023109 A1 * 2/2005 Barry et al. ............ 198/457.05

* cited by examiner

CAROUSEL FOR THE WAREHOUSING OF GOODS

The present invention relates to a rack for the warehousing of goods. In particular, the present invention relates to a rack for the warehousing of goods usable advantageously for the dynamic warehousing of goods located inside containers, for example crates, boxes or similar, of which the description which follows will make specific mention without thereby losing in generality.

BACKGROUND TO THE INVENTION

In general, motorised racking systems have been known for some time, capable of storing goods dynamically.

These racking systems are capable of setting the stored goods in motion until they present a sought object at a picking station from which it can be taken.

In general, the techniques of moving the goods most widely used are those in which the goods are arranged inside containers or boxes which are made to circulate freely by means of, and on, conveyor devices.

In the case of storage on conveyor devices, it is desirable to use systems for dynamic identification of the moving objects, for example of the type using barcodes, magnetic code, transponders or similar, which is not however required for fixed racks where it is sufficient to store in a database the location where the item has been placed.

Currently, motorised racking systems are known of the type with a single track, which are capable of carrying out a service analogous to racking systems of the gravity type, i.e. capable normally of housing only a single type of article or goods in movement.

In this case the picking sequence is a predefined sequence to define a system of warehousing usually identified by the acronym LIFO (last in, first out: the last to come in is the first to go out) if access is from a single side; or on the other hand with the acronym FIFO (first in, first out): the item which came in first is the first to go out) if the loading of the boxed goods takes place on one side while unloading takes place on a different side.

Racking systems of these types are for example described and illustrated in the International Patent application PCT no. WO 02/074663 and in United States patent application no. US 2003/152446.

Motorised racks of the recirculating type are also known, including a system of conveying in a loop in which the stored goods can move in a closed circuit or loop and therefore present themselves selectively at a pre-established station, from which it is then possible to carry out the loading of new boxed goods or the unloading outwards of goods previously warehoused in the said racks.

These types of recirculating racks in general include parallel linear conveyors provided with 180° curves at the ends, and are characterised by a constant high-speed motion, and therefore allow rapid operations of search and identification of objects, although for the extraction of the objects themselves, complicated devices are necessary which require manipulation techniques; furthermore, the above-mentioned curves necessitate relatively large dimensions and are therefore cumbersome.

Racking systems of these types are for example described and illustrated in Japanese Patent application no. JP 1.122.814 and in U.S. Pat. No. 3,303,918.

Other types of motorised racks currently known are defined by conveyor means arranged side by side, capable of moving the boxed goods in opposite directions. In these racks, there are means of stopping and means of lateral transposition capable of allowing the movement of the boxed goods.

These racks, as for example those described and illustrated in International Patent application no. WO 99/35061, in Japanese patent application no. JP 1.321.205 and in U.S. Pat. No. 3,662,905, have the advantage of being of compact dimensions, with structurally simple exit/entry portions for the goods, but have extremely low productive speeds of recirculating movement because of the continual stops and transposing movements.

SUMMARY OF THE PRESENT INVENTION

The present invention relates to a rack for the warehousing of goods. In particular, the present invention relates to a rack for the warehousing of goods usable advantageously for the dynamic warehousing of goods located inside containers, for example crates, boxes or similar, of which the description which follows will make specific mention without thereby loosing in generality.

An object of the present invention is to eliminate the disadvantages of the known art documented above.

According to the present invention a rack is created for the dynamic warehousing of goods boxed in containers, of the type described with reference to at least one of the claims which follow.

BRIEF DESCRIPTION OF THE DRAWINGS

The technical characteristics of the invention can be clearly discovered from the contents of the claims made below, and its advantages will become more evident in the detailed description which follows, made with reference to the attached drawings, which represent a preferred form of embodiment, purely exemplary and not limiting, in which:

DETAILED DESCRIPTION OF THE PRESENT INVENTION

With reference to the attached figures, no. 1 globally indicates a motorised rack for the warehousing of goods (not illustrated), which are located inside containers or boxes S in motion along an annular path.

Figure 1:
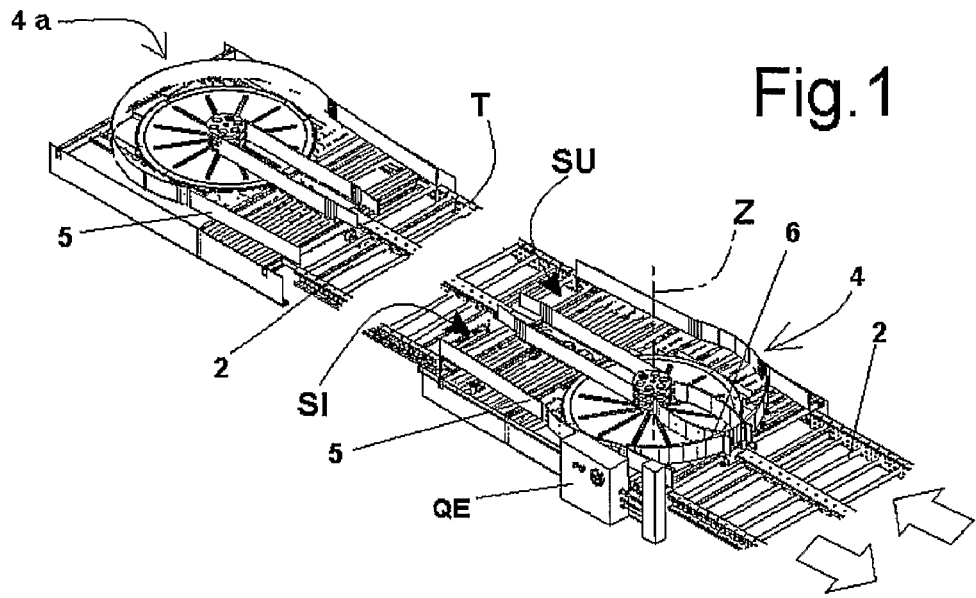
FIG. 1 is a schematic perspective view of a motorised rack according to the present invention.
Figure 2:
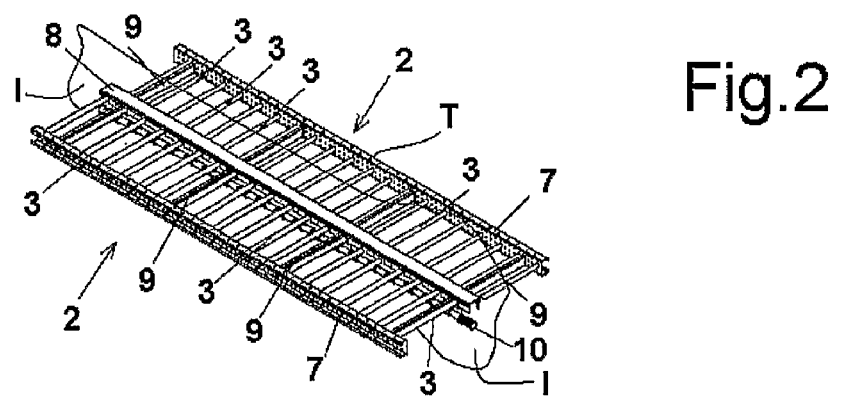
FIG. 2 is a schematic view, on an enlarged scale, of a central portion of FIG. 1.
Figure 3:
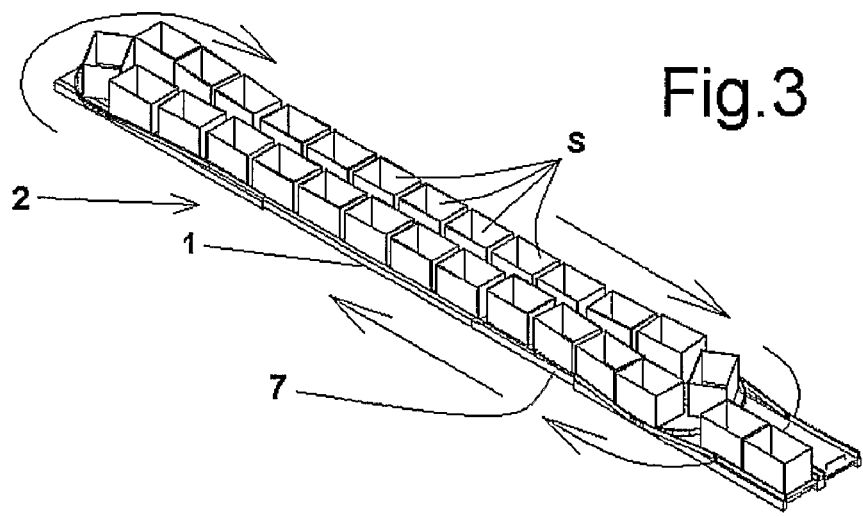
FIG. 3 is a schematic view of FIG. 1 in operating conditions, with which a plurality of objects to be stored is associated.

Rack 1, including at least two bi-directional conveyor modules 2, each of which is rectilinear (without this representing a limitation to the present invention), is provided with respective conveyor rollers 3 (FIGS. 1 and 2). The modules 2 are connected to each other by motion-inverting devices which for simplicity will be designated curves, and which are connected to modules 2 by operating stations facing each other: these will be designated entry station SI or exit station SU depending on the current direction of advancement of containers S along the annular path. In accordance with an anticlockwise direction of advance in FIG. 1, the entry station SI is located to the left of an ideal median longitudinal plane I located between the two modules, and the exit station SU is located to the right of this centre plane. This plane I is visible only with reference to FIG. 2.

Figure 4:
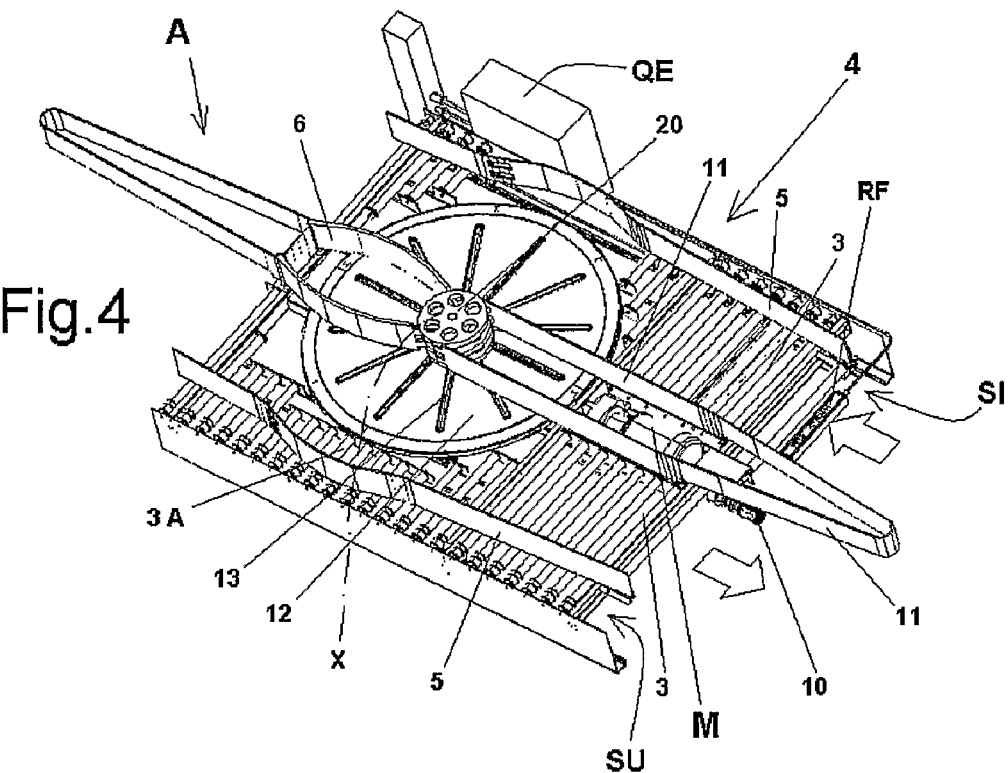
FIG. 4 is a first view on an enlarged scale of an end portion of FIG. 1, illustrated in a first operating condition.
Figure 5:
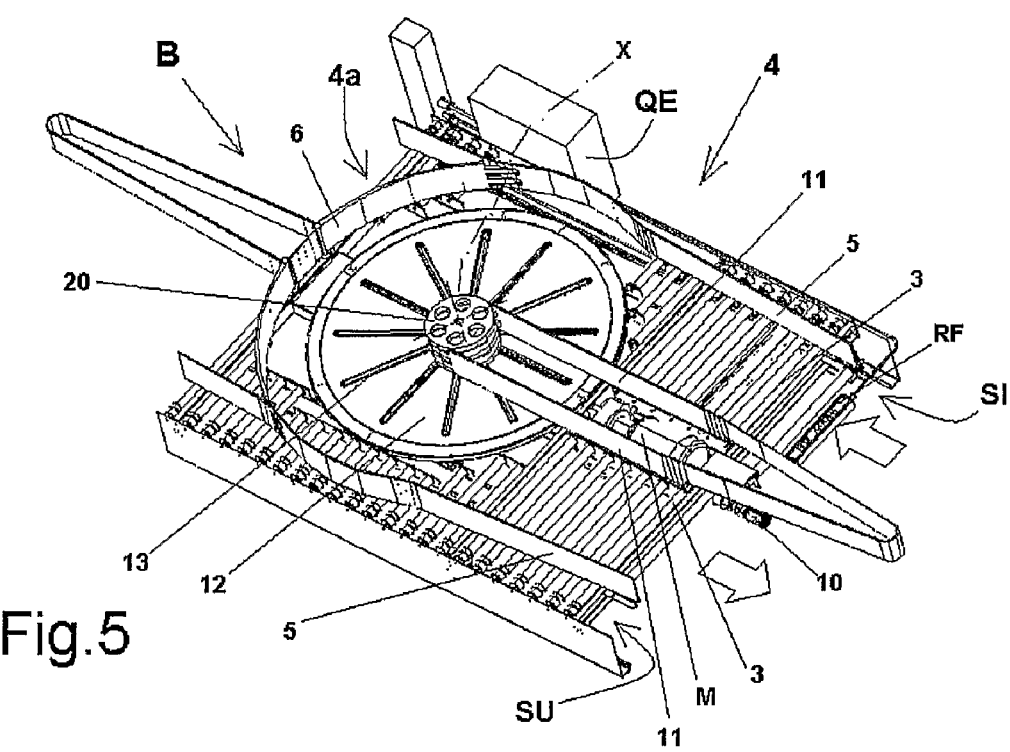
FIG. 5 is a second view of the end portion of FIG. 4, illustrated in a second operating condition.

Still with reference to FIG. 1, rack 1 includes a tail-end/recirculating curve 4a fitted with fixed lateral guides 5 and a head-end curve 4 fitted with end guides 6 movable between an open operating position A (FIG. 4), to allow the exit or entry of boxed goods, and a closed position B (FIG. 5). Both curves, 4 and 4a, are structured to cause the inversion of the movement of the boxes S through 180° around a determinate vertical axis Z, located in a position substantially central to the ends of rectilinear modules 2.

According to what is illustrated in FIG. 2, the module 2 has a determinate length, and includes two side longitudinal members 7, one central longitudinal member 8, located in line with the longitudinal median plane I, and at least four crosspieces 9 which have the function of rigidly supporting said central longitudinal member 8 and (in freely rotatable manner) a longitudinal shaft 10, through a plurality of bearings known and not illustrated.

The side longitudinal members 7 and the central longitudinal member 8 are capable also of defining respective containment guides for the box containers S.

Figure 22:
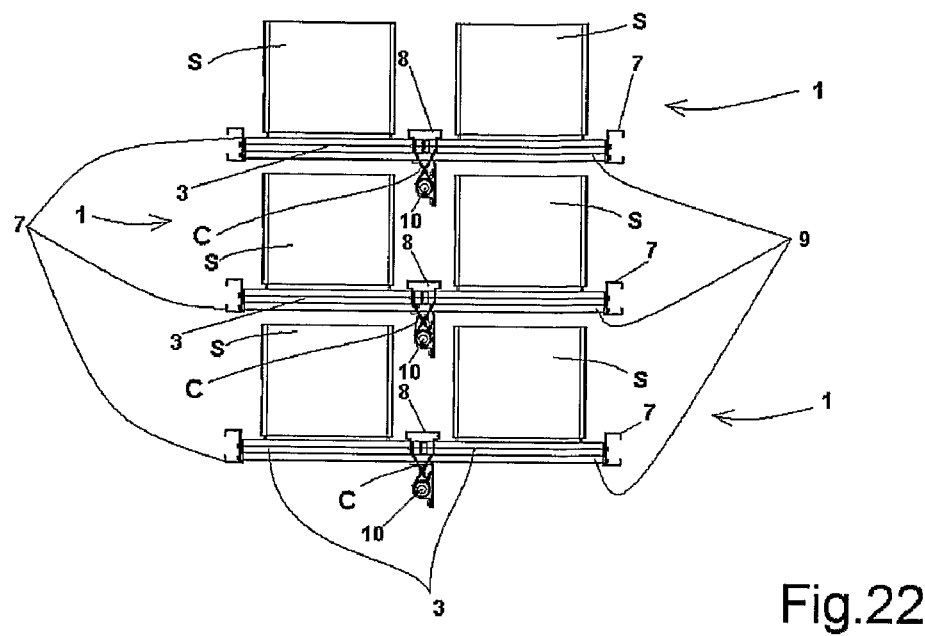
FIG. 22 represents a transverse view in lateral elevation of a plurality of racks according to FIG. 1, each one of which has associated with it a plurality of objects to be warehoused.

A solution is used called "LINE SHAFT DRIVE" which consists of the longitudinal shaft 10 which transmits the movement to a plurality of independent polyurethane belts C visible only in FIG. 22, each one of which is capable of effecting the rotation of a respective conveyor roller 3 through a clutch transmission of known and not illustrated type.

The longitudinal members 7 and 8 and the cross-pieces 9 are advantageously slotted together and suitably bolted to define a frame T, while rollers 3 are provided in known and not illustrated manner with a spring-loaded pin at the end to allow rapid assembly without the need for special tools.

Figure 10:
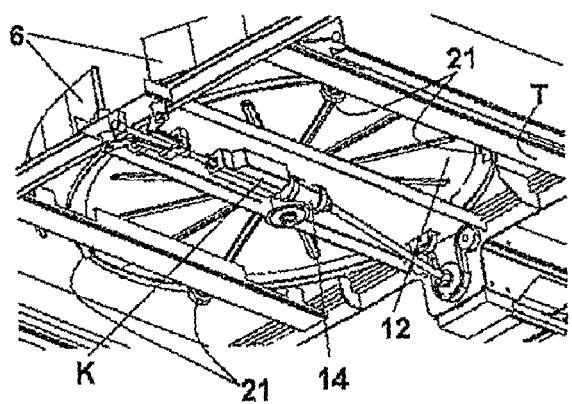
FIG. 10 is a perspective view from below on an enlarged scale of the portion illustrated in FIGS. 4 and 5.
Figure 11:
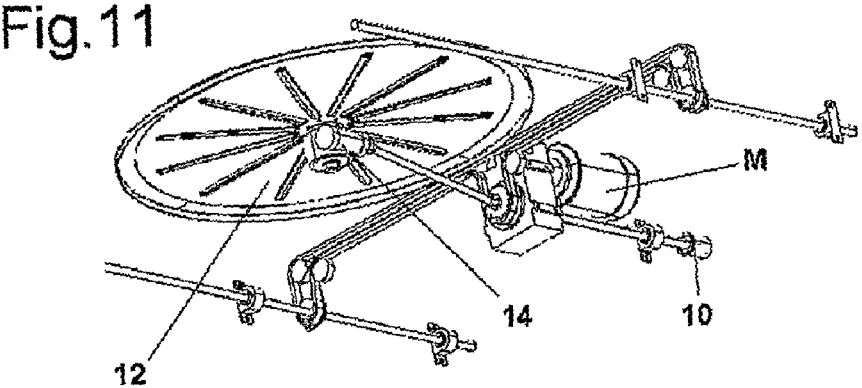
FIG. 11 is a view on a reduced scale of the portion illustrated in FIG. 10.
Figure 12:
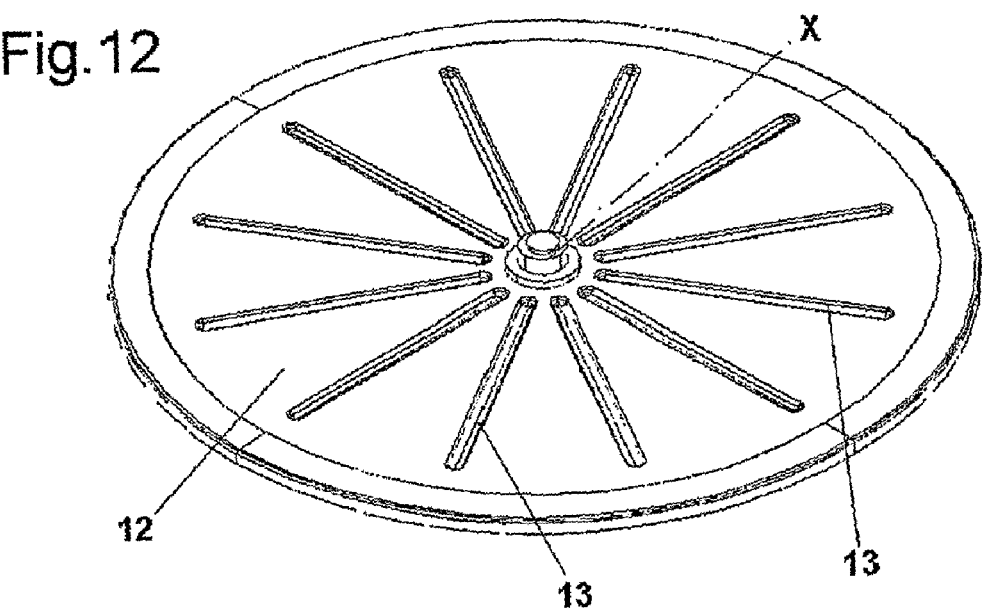
FIGS. 12 and 13 illustrate, respectively from below and above, details taken from FIG. 10.
Figure 13:
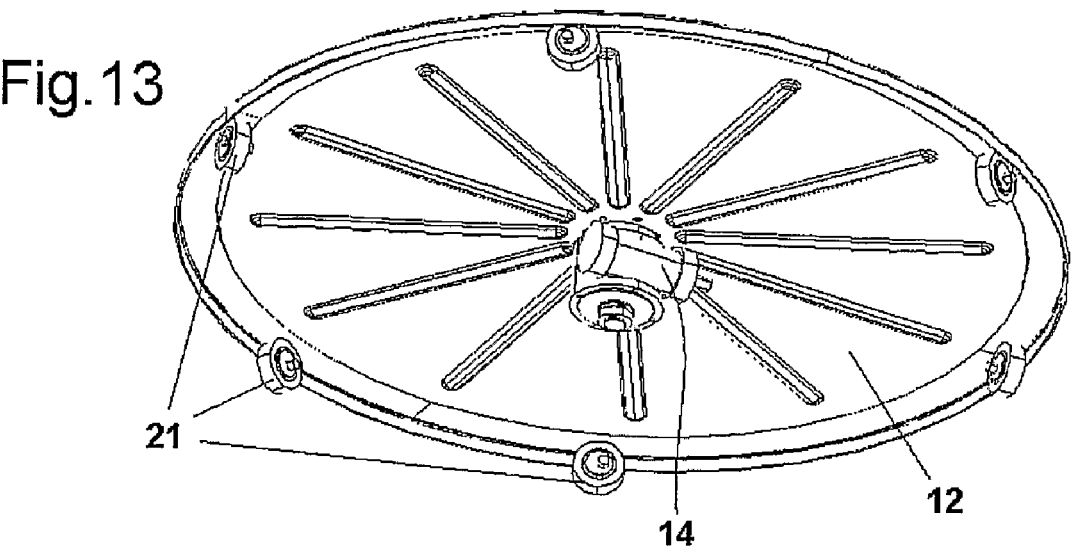
Figure 14:
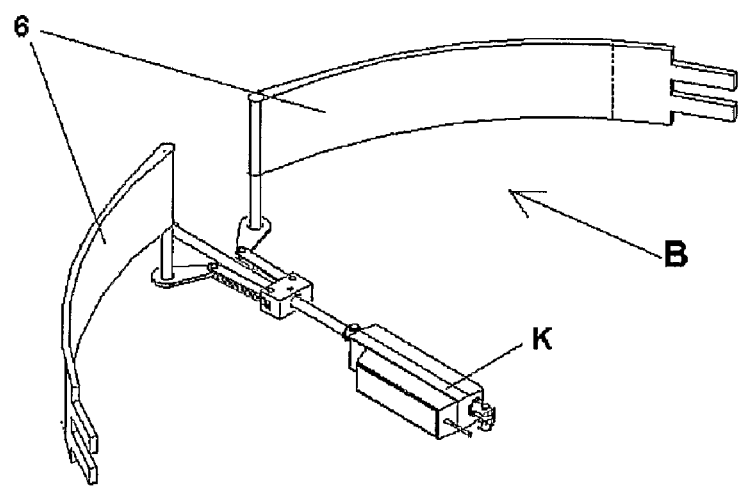
FIGS. 14 and 15 are, respectively, two perspective views of a detail taken from FIGS. 4 and 5.
Figure 15:
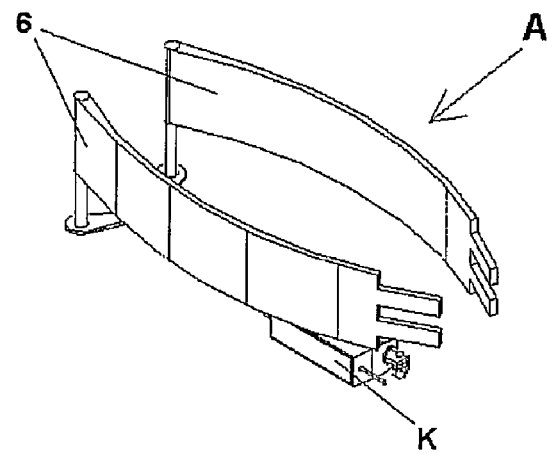
Figure 16:
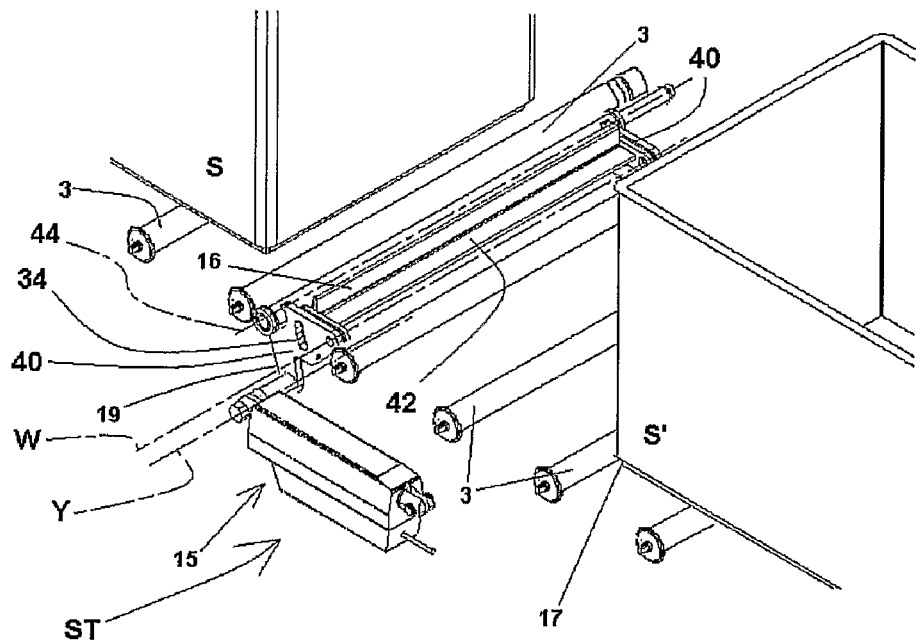
FIG. 16 is a perspective view of an operating unit associated with the central portion of FIG. 2.
Figure 17:
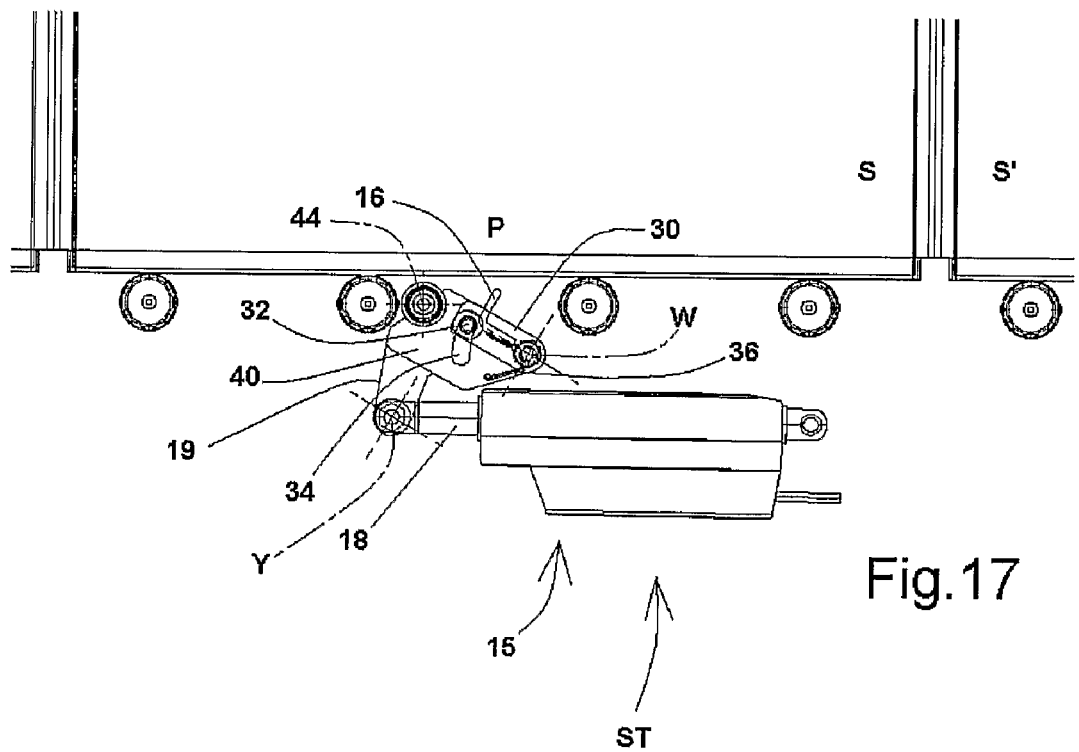
FIGS. 17 to 20 are lateral views of FIG. 16 in respective different operating positions.
Figure 23:
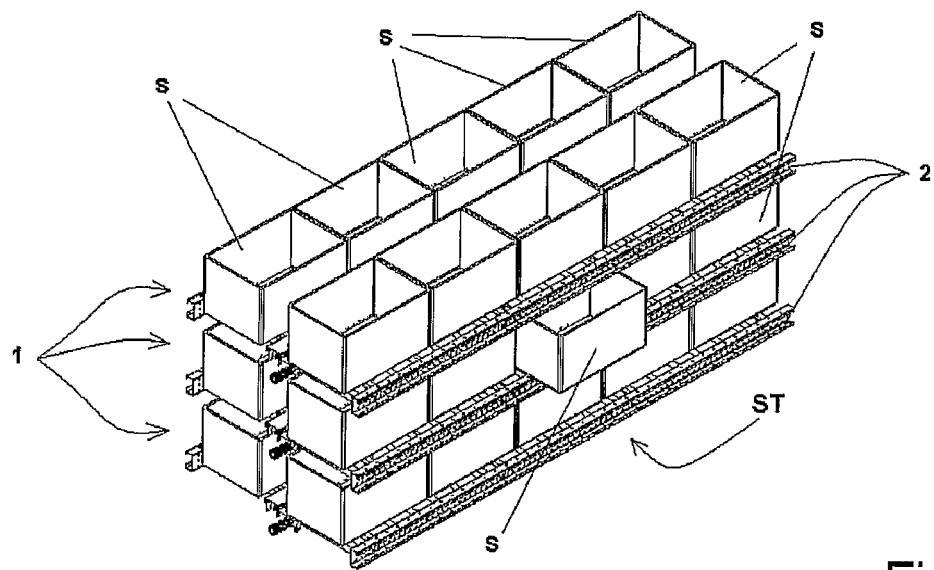
FIG. 23 is a schematic perspective view of FIG. 22, on a reduced scale and with parts removed for clarity.

The presence of a single central shaft 10 has the following advantages:

i) structural advantage, central shaft 10 can be placed above longitudinal central member 8 which runs between containers S, and can therefore be located between the moving containers S themselves. FIG. 22 demonstrates the advantage of the reduction in height, while FIG. 23 shows how it is possible to carry out manual extraction of box S.

ii) economic advantage, since in order to contain costs and thrusts, a very wide spacing between rollers 3 is used, preferably 150 millimeters with the rollers having a diameter of at least 40 millimeters. Where it is thought necessary, even diameters of 50 millimeters are permitted, without this being assumed as a prescription which limits the protective scope of the present invention. With reference to FIGS. 4 and 5, curve 4 has been enlarged to allow the rotation through 180° of boxes S around the respective axis Z, and is equipped with a central guide 11, and a central drum 20 carried idly coaxially with axis Z itself with the function of internal guide to curve 4, to describe two adjacent parallel tracks which function as a continuation of the two adjacent modules 2. Curve 4, furthermore, includes fixed lateral guides 5 located on the outside and head-end guides 6, manoeuvrable through a switching device K better visible in FIGS. 10, 14 and 15, to allow access for entry and exit of containers S to and from rack 1, with configuration variable between an operating position A visible in FIGS. 4 and 6 and a position B visible in FIGS. 5 and 7. In particular, head-end guides 6 are curved and capable of connecting to external lateral guides 5, and they create a substantially circular edge.

The curve 4 is sized radially in such a way as to present transverse dimensions of two modules 2 side by side, and has conveyor components in common with the modules 2 themselves, i.e. the rollers 3A functionally operated by belts C through shaft 10, and bearings known and not illustrated.

The curve 4 includes a rotation disc 12 (FIGS. 4 and 5, and 10 to 13), preferably made of metal, supported by frame T in line with a vertical axis X of rotation laterally displaced with respect to axis Z by a determinate distance so as to move containers S along a semicircular path when, in use, guide 6 is located in above-mentioned operating position B. Furthermore, axis X is displaced with respect to axis Z of rotation of drum 20, on the opposite side of the modules 2.

Figure 6:
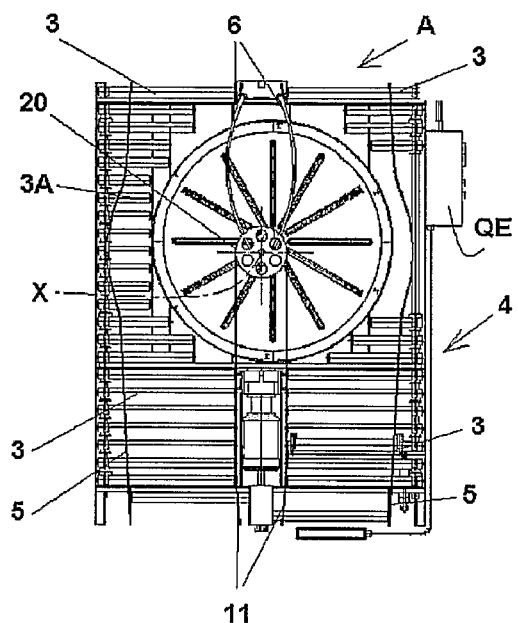
FIG. 6 is a plan view of the end portion of FIG. 4.
Figure 7:
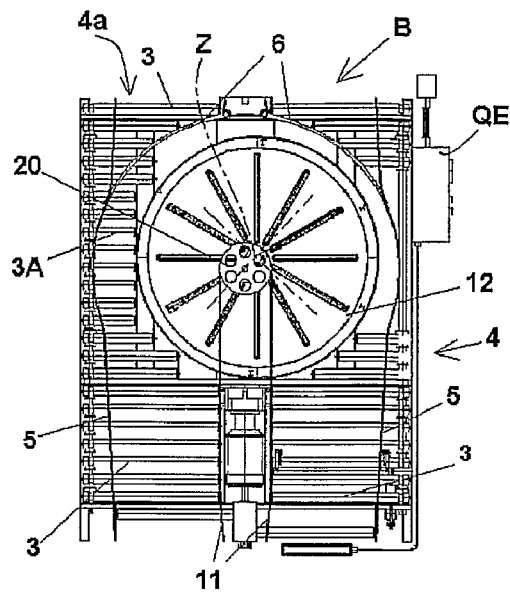
FIG. 7 is a plan view of the end portion of FIG. 5.
Figure 8:
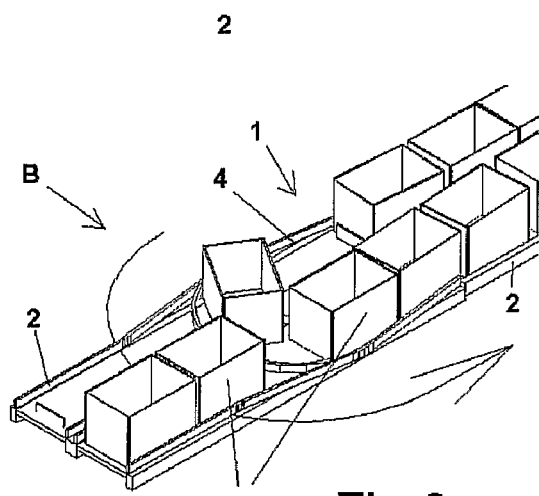
FIG. 8 is a schematic perspective view of the portion of FIG. 4 with which a plurality of objects to be warehoused is associated.
Figure 9:
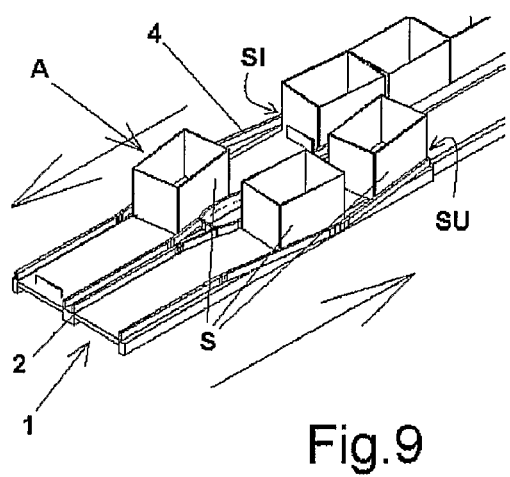
FIG. 9 is a schematic perspective view of the portion of FIG. 5 with which a plurality of objects to be warehoused is associated.

It will be noticed that disc 12 is located in a central position between a plurality of realigning rollers 3A of reduced length, parallel to and substantially coplanar to rollers 3, and located at the exit from curve 4 according to an anticlockwise direction of advancement of boxes S with reference to FIGS. 6 and 7, to make containers S resume their rectilinear trajectory without impacting central guide 11. Such rollers 3A are missing only in a portion localised to ¼ of the circular path prescribed for boxes S on disc 12 according to an anticlockwise circular trajectory in FIGS. 6 and 7. The operation of curve 4 is based on rotating disc 12 which, in accordance with position B, moves containers S, carrying them on the return track with a rotation of 180° along the above-mentioned semicircular path, according to the flow of movement illustrated in FIGS. 8 and 9. The reduced length of rollers 3A allows the latter to cooperate with disc 12 in supporting each box S only partially, in such a way as to make possible the gradual variation in speed of the boxes at the inversion of the movement between the preceding and the subsequent modules 2. It should be noted that the displacement of axis X with respect to axis Z is arranged laterally by an amount equal to half the length of rollers 3A.

On the other hand, the modules 2 present a zone with a greater density of rollers 3 (preferably double) immediately upstream and downstream of rotating disc 12, in such a way as to increase the dragging effect on boxes 3 both in entry and in exit from head-end curve 4.

Preferably but without limiting effect, the rotating disc 12 can be formed in a single piece by moulding, and has a low thickness so as to be sufficiently flexible and always rest on castors 21, carried by frame T. The castors 21 will be better described below, and are visible in FIGS. 10 and 13. The disc 12 can be provided with radial ribs 13 and a stiffening edge and adapting chamfer facing downwards.

The disc 12 is coupled mechanically to a transmission including a reducer 14 carried by frame T, and is gripped between two clutch discs (FIGS. 10, 11) for limiting the thrust. The disc 12, furthermore, rests at its periphery on six castors 21, installed in such a way as to be adjustable in height in a known and not illustrated manner, for the purpose of linking up correctly a plane defined by an upper generating line of rollers 3 and 3A with the plane of disc 12 itself. The reducer 14 takes its motion directly from a reduction motor M coupled mechanically to the central shaft 10 by means of a shaft delimited longitudinally by cardan joints. The transmission ratio of reducer 14 is such as to confer on disc 12 a peripheral speed at the average radius equal to about double the speed of advancement of the boxes S on modules 2. It will be noticed that reduction motor M is the only actuator provided for the activation of rollers 3, rollers 3A and disc 12 on rack 1. In fact, the reduction motor M is connected to disc 12 by means of reducer 14 and to rollers 3 and 3A by means of the above-mentioned belts 22.

With particular reference to FIGS. 6 and 7, in use, rollers 3A feed boxes S towards the receiving module 2 at a speed of advancement equal to 1.5 times the feed speed of the boxes themselves on rollers 3 of modules 2. The boxes S are therefore fed onto disc 12 which accelerates them to a speed double the feed speed, and then they are slowed down by rollers 3A to a speed which is 1.5 times the feed speed given by rollers 3, to then slow down further on rollers 3. The reason for these variations in speed is as follows: boxes S must be separated from each other. Once transferred onto disc 12, each box S slides towards the outside because of the difference in centres of rotation between disc 12 and drum 20. This sliding towards the outside causes, initially, a further increase in speed since box S is moving towards greater radii. In the last part of its rotation through 180°, the box S, which has been pushed beyond the edge of the disc by the central idler drum, meets the slowing rollers which realign it with the bi-directional conveyor. Guides 5, 6 and 11 have sufficient vertical extension and robustness to contain the thrust of containers S which is generated when these are arrested by blade 16 against the forward thrust produced by rollers 3 of the module which feeds containers S onto curve 4. Reduction motor M is located between internal guides 11 and has a lesser overall vertical dimension than guides 5, 6 and 11, and reducer 14 has a limited vertical extension. This makes each rack 1 particularly limited in height and suitable for stacking, taking up little room vertically without creating restrictions on the forward movement of the boxes S on the rack 1 below.

According to what is illustrated in FIGS. 16 to 20, the rack 1 is furthermore provided with a blocking device 15 located at picking station ST, including the transverse blade 16, supported rotatably around an axis parallel to rollers 3 by two relative lateral flanges 30. This blade 16 is interposed between two consecutive rollers 3 of the receiving module 2, and has overall dimensions such that it can be inserted between the two mentioned rollers 3, so as to spring up to engage a free space between two consecutive boxes S, in such a way as to block the advance of the box S which follows, according to the modality of advancement of the two boxes S in question. For this purpose, the blocking device 15 includes a frame 19 provided with two brackets 40 connected to each other by a crosspiece 42, capable of synchronising the rotation of brackets 40 with respect to longitudinal members 7 and 8 which, respectively, support them freely rotatably around an axis parallel to rollers 3 and located below the running plane of rollers 3. Each bracket 40 carries rotatably a respective flange 30 of blade 16, which presents, in its turn, at least one tappet 32, which engages sliding a slot 34 formed in one of the brackets 40 to guide blade 16 itself in rotation, and to limit its respective rotation with respect to brackets 40. Between each flange 30 and the respective bracket 40, an elastic connection is provided which includes a torsion spring 36, suitable for keeping said flange with its respective tappet 32 adjacent to an upper end of slot 34, and selectively deformable by the bottom of a box S. Blocking device 15 also includes at least one actuator 18 capable of imparting a rotation to frame 19 around a respective axis 44 parallel to rollers 3 from a starting position P through an angle sufficient to position blade 16 into an activation position P', in which this blade 16 occupies the space below the running plane of rollers 3, provided that this plane is unencumbered by boxes S. In position P', blade 16 brushes the bottom of the corresponding box 3 causing the torsion of spring 36, until the condition occurs in which the running plane of boxes S themselves becomes free. It will be noted that in FIGS. 17-20 the reference number 18 has been used for convenience to indicate the thrust component of actuator 18, referring to the respective capacity for moving frame 19 around axis 44, without this being able to cause prejudice to the description itself.

Figure 18:
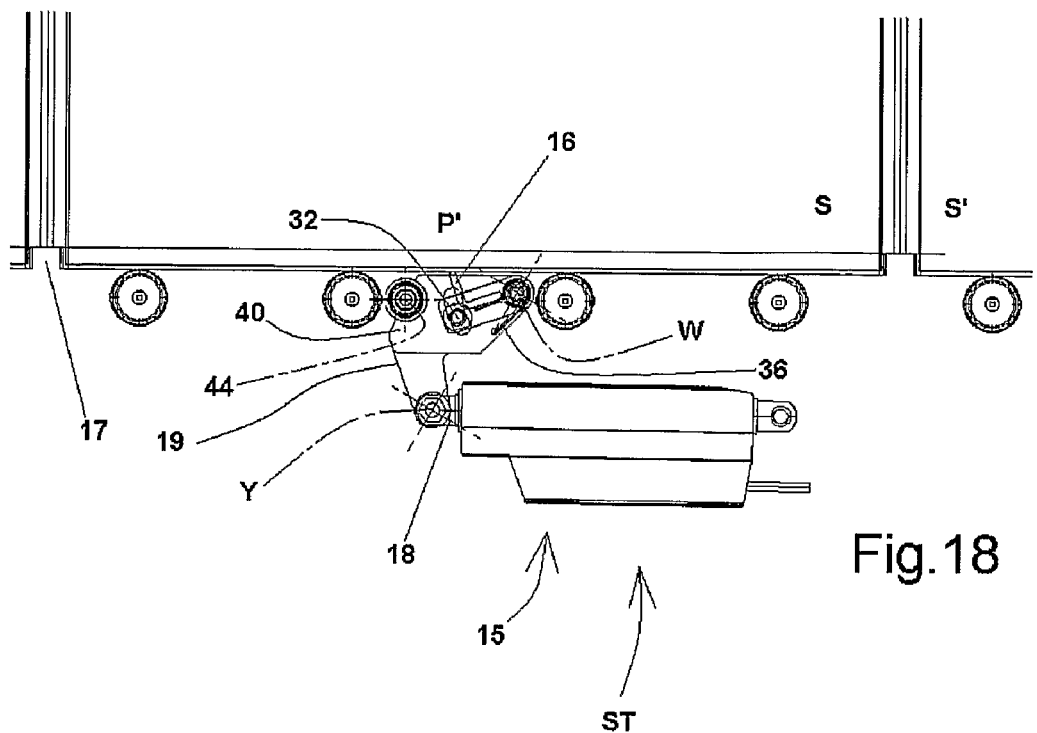
Figure 19:
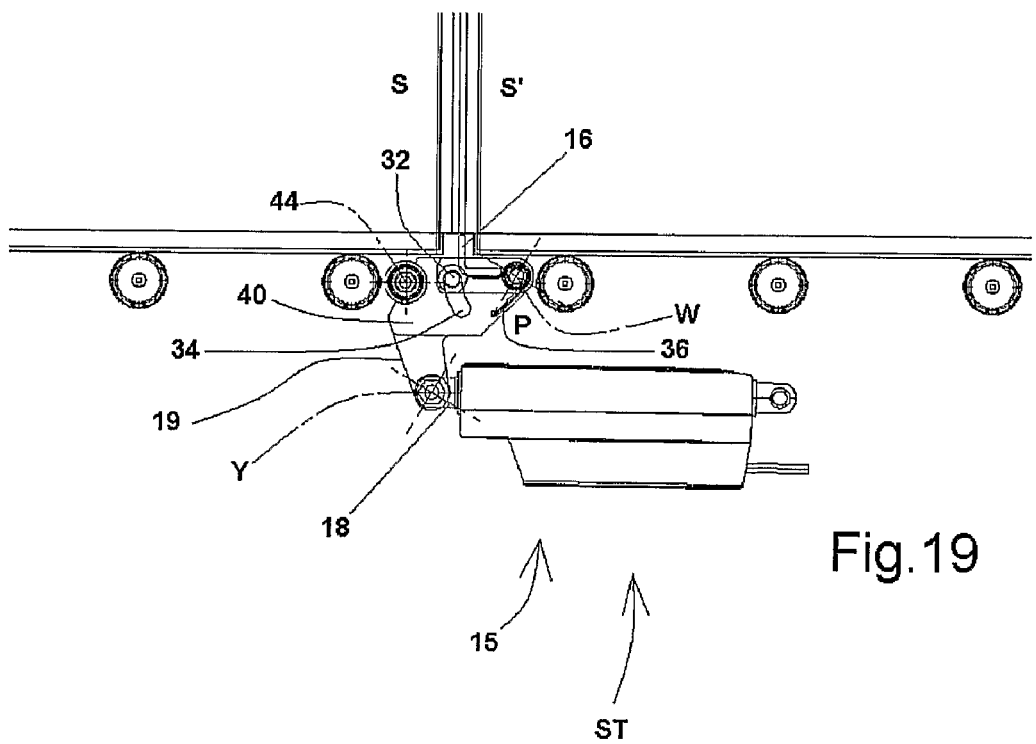
Figure 20:
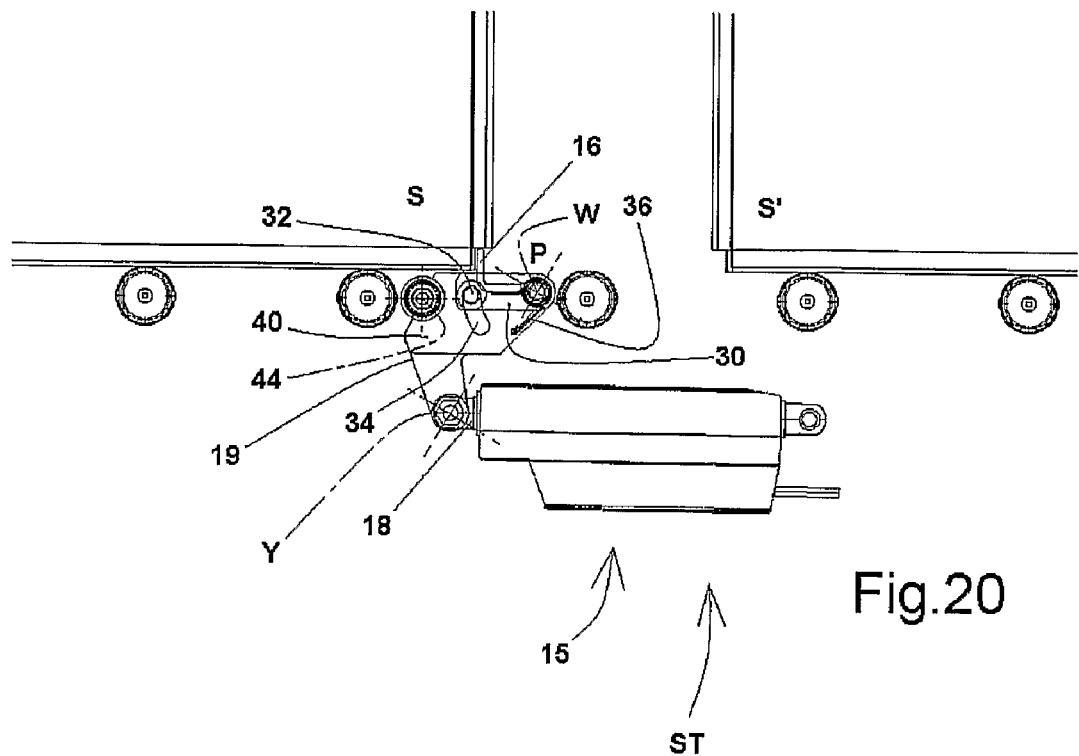

In use, as soon as the activation of actuator 18 is commanded, the frame 19 is rotated in such a way as to push blade 16 into the position visible in FIG. 18 in contact with the bottom of a box S, in which the spring 36 is deformed so as to arm blade 16 advantageously in advance, in such a way as to make it ready to spring up once box S itself has passed (FIGS. 19 and 20), for the purpose of blocking the advance on rollers 3 of the box S which follows in the direction of advance.

Figure 21:
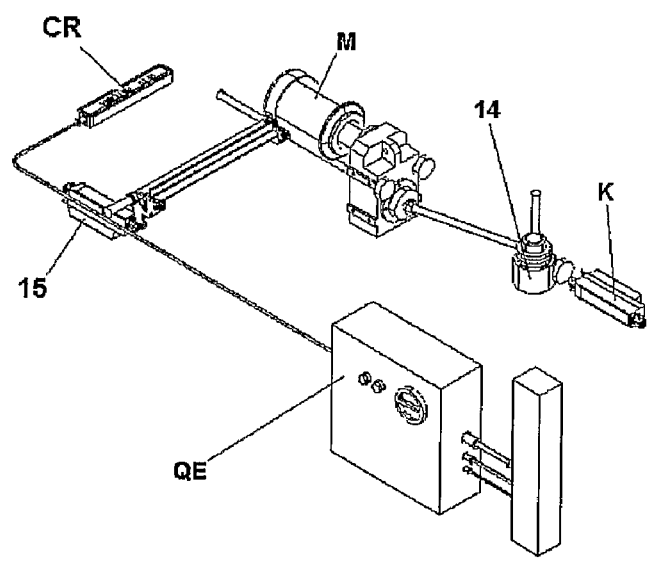
FIG. 21 represents the electrical and electronic components present in the end portion of FIGS. 4 and 5.

The electronic management of each rack 1 is entrusted to an electronic panel QE, located close to head-end curve 4, and including electrical and electronic components visible in FIG. 21. The electronic system governing rack 1 (see FIG. 21) memorises the order in which containers S are kept, in order to prearrange the intervention of blocking device 15. Adjacent to the head-end curve 4, therefore, we find the reduction motor M, the blocking device 15, the switching device K, and a code reader CR, in the event that the boxes S carry codes. The achievement of this result is made possible by the rollers 3, clutch driven at low thrust, for the correct performance of the containment guides at the curves 4.

In conclusion, rack 1, the subject of the present invention, has the following characteristics:

conveyor lines (outward and return) side by side for minimum transverse overall width;

each recirculating curve 4 is such as to allow continuous recirculation between adjacent tracks. The width dimensions of the curves are comparable to those of two rectilinear conveyor modules 2 side by side;

each curve 4 is fitted with guides with variable geometry which allow simultaneous access for loading and unloading at the head-end from the same side, in order to allow the racks to run alongside each other;

each box's entry to and exit from rack 1 is effected solely through movement on rollers;

each rack 1 has minimum overall height to allow vertical stacking with a high rate of exploitation of the available volume, and therefore without waste of space;

the construction of each individual rack, and of warehouses fitted with a plurality of racks is modular, inexpensive and highly reliable;

silent and collision-free operation;

operation which does not require maintenance or lubrication for maximum cleanliness of the goods;

independent electronic management for each individual rack 1.

The operation of rack 1 described above is clear from the above description, and does not require further explanation.

Finally, it is clear that modifications and variations may be made to rack 1 here described and illustrated without for this reason departing from the protective compass of the present invention.

It will be noted that curve 4*a* is structured similarly to curve 4, simplified by the fact of not including movable guides 6 and therefore it has the same function as the curve 4 having the movable guides 6 in the respective position B.

Naturally, the fact that axis X is displaced with respect to axis Z on the side of one of the two operating stations and on the opposite side of modules 2, renders the rack more efficient for a determinate direction of advance of containers S on rollers 3 and on disc 12. In particular, the advantages of rack 1 described above may be encountered when the direction of advancing movement of containers S locates station SI (for entry to curve 4) on the side of axis X, but for reduced speeds, the rack 1 can operate correctly even if activated in the opposite direction.

The invention claimed is:

1. Rack (1) for the dynamic warehousing of goods boxed in containers(S), comprising:
    at least one conveyor device (2) for moving said containers (S) bi directionally along an annular path; and
    means (4 and 4*a*) for reversing a direction of movement, said means being connected to said conveyor device (2) and said means including:
    variable-geometry guiding means (6) movable between an open operating position (A) and a closed position (B), and
    at least one rotating disc (12) for transporting said containers (S) along a substantially semicircular path corresponding to said closed operating position (B), to divert them, through 180° around a determinate axis (Z).

2. Rack according to claim 1, wherein said direction-reversing means (4) comprises an entry station (SI) and an exit station (SU) adjacent to each other, said entry station (SI) being located upstream of said exit station according to a preferred direction of travel of said at least one conveyor device (2); an idler drum (20) is located between said entry and exit stations (SI; SU) coaxially with said determinate axis (Z); said disc (12) has a central axis (X) laterally displaced with respect to a longitudinal median plane (I).

3. Rack according to claim 2, wherein said central axis (X) is laterally displaced with respect to said longitudinal median plane (I) near said entry station (SI).

4. Rack according to claim 2, wherein said disc (12) is adjacent to advancing means (3A) of reduced transverse extension compared with a transverse dimension of said containers (S) and activatable to gradually produce changes in a speed of said containers (S) moving across said direction-reversing means (4).

5. Rack according to claim 1, wherein said at least one conveyor device (2) includes a plurality of rollers (3) arranged transversely to a substantially rectilinear direction of movement and activated in axial rotation by independent belts (22).

6. Rack according to claim 5, wherein said at least one conveyor device (2) includes at least one side longitudinal member (7), one central longitudinal member (8) and a plurality of cross-pieces (9) for supporting a single central longitudinal shaft (10); said longitudinal shaft (10) being mechanically connected to said rollers (3) to activate said belts (22).

7. Rack according to claim 1, further comprising: transverse blocking means (15) capable of being inserted between two of the said containers (S) adjacent to each other, to stop the advance of one of the two such containers (S).

8. Rack according to claim 7, wherein said blocking means (15) includes linear actuating means (18) connected to flanged means (19), for supporting a transverse blade (16).

9. Rack according to claim 7, wherein said blocking means includes an elastic device (36) for making said blade (16) spring into position between two containers (S) after the passage of the first of the two said containers (S) according to a direction of advance.

10. Rack according to claim 1, further comprising: a single rotary actuator (M) to activate said longitudinal shaft (10) and said direction-reversing means (4).

11. Rack according to claim 1, further comprising: an electrical panel (QE) for control and monitoring, located adjacent to said direction-reversing means (4).

12. Rack according to claim 2, wherein said variable-geometry guiding means (6) include at least one curved section so as to create a substantially circular edge which can be opened and alternatively connected to lateral guides (5) located at the interface between said direction-reversing means (4) and each said conveyor device (2) and to a periphery of said idler drum (20).

13. Rack according to claim 12, wherein said variable-geometry guides (6) and said lateral guides (5) have a lateral extension which exceeds an overall vertical dimension of said rotary actuator (M) so as to make said at least one conveyor device (2) particularly shallow, and capable of being stacked while occupying limited space vertically, without creating restrictions on a forward movement of said containers (3).

14. Rack (1) for the dynamic warehousing of goods boxed in containers(S), comprising:
    at least one conveyor device (2) for moving said containers (S) bi directionally along an annular path; and
    means (4 and 4*a*) for reversing a direction of movement, said means being connected to said conveyor device (2) and said means including:
    variable-geometry guiding means (6) movable between an open operating position (A) and a closed position (B), and
    at least one rotating disc (12) for transporting said containers (S) along a substantially semicircular path corresponding to said closed operating position (B), to divert them, through 180° around a determinate axis (Z);
    wherein said direction-reversing means (4) comprises an entry station (SI) and an exit station (SU) adjacent to each other; said entry station (SI) being located upstream of said exit station according to a preferred direction of travel of said at least one conveyor device (2); an idler drum (20) is located between said entry and exit stations (SI; SU) coaxially with said determinate axis (Z); said disc (12) having a central axis (X) laterally displaced with respect to a longitudinal median plane (I);
    wherein said disc (12) is adjacent to advancing means (3A) of reduced transverse extension compared with a transverse dimension of said containers (S) and activatable to gradually produce changes in a speed of said containers (S) moving across said direction-reversing means (4);
    wherein said at least one conveyor device (2) includes a plurality of rollers (3) arranged transversely to a substantially rectilinear direction of movement and activated in axial rotation by independent belts (22); and wherein said central shaft (10) is coupled rotatably to said belts by means of clutch pulleys.

15. Rack (1) for the dynamic warehousing of goods boxed in containers(S), comprising:

at least one conveyor device (2) for moving said containers (S) bi directionally along an annular path; and means (4 and 4*a*) for reversing a direction of movement, said means being connected to said conveyor device (2) and said means including:

variable-geometry guiding means (6) movable between an open operating position (A) and a closed position (B), and at least one rotating disc (12) for transporting said containers (S) along a substantially semicircular path corresponding to said closed operating position (B), to divert them, through 180° around a determinate axis (Z);

wherein said at least one conveyor device (2) includes a plurality of rollers (3) arranged transversely to a substantially rectilinear direction of movement and activated in axial rotation by independent belts (22);

wherein said at least one conveyor device (2) includes at least one side longitudinal member (7), one central longitudinal member (8) and a plurality of cross-pieces (9) capable of supporting a single central longitudinal shaft (10); said longitudinal shaft (10) being mechanically connected to said rollers (3) to activate said belts (22); and wherein said central shaft (10) is coupled rotatably to said belts by means of clutch pulleys.

\* \* \* \* \*